United States Patent Office 3,115,115
Patented Dec. 24, 1963

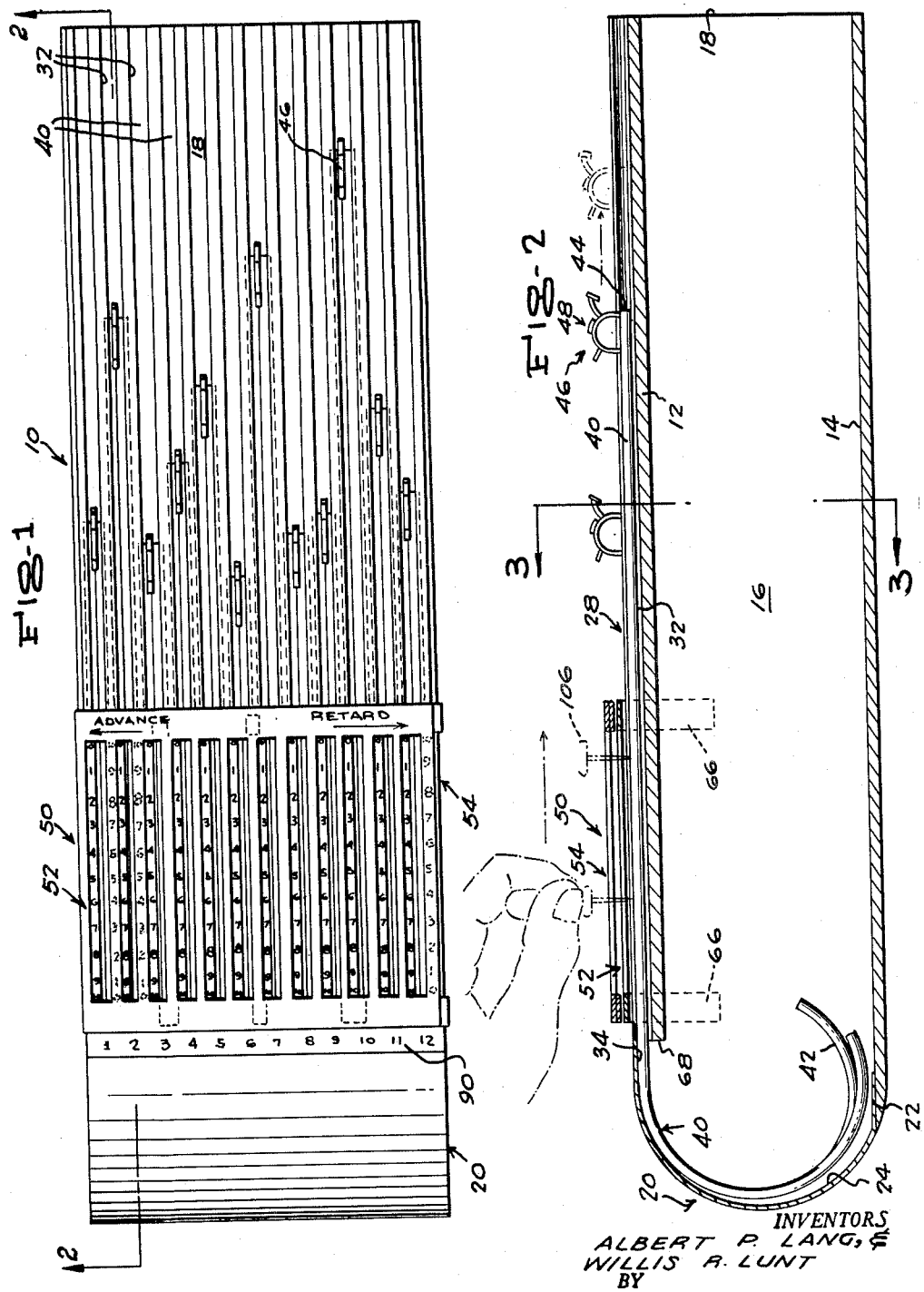

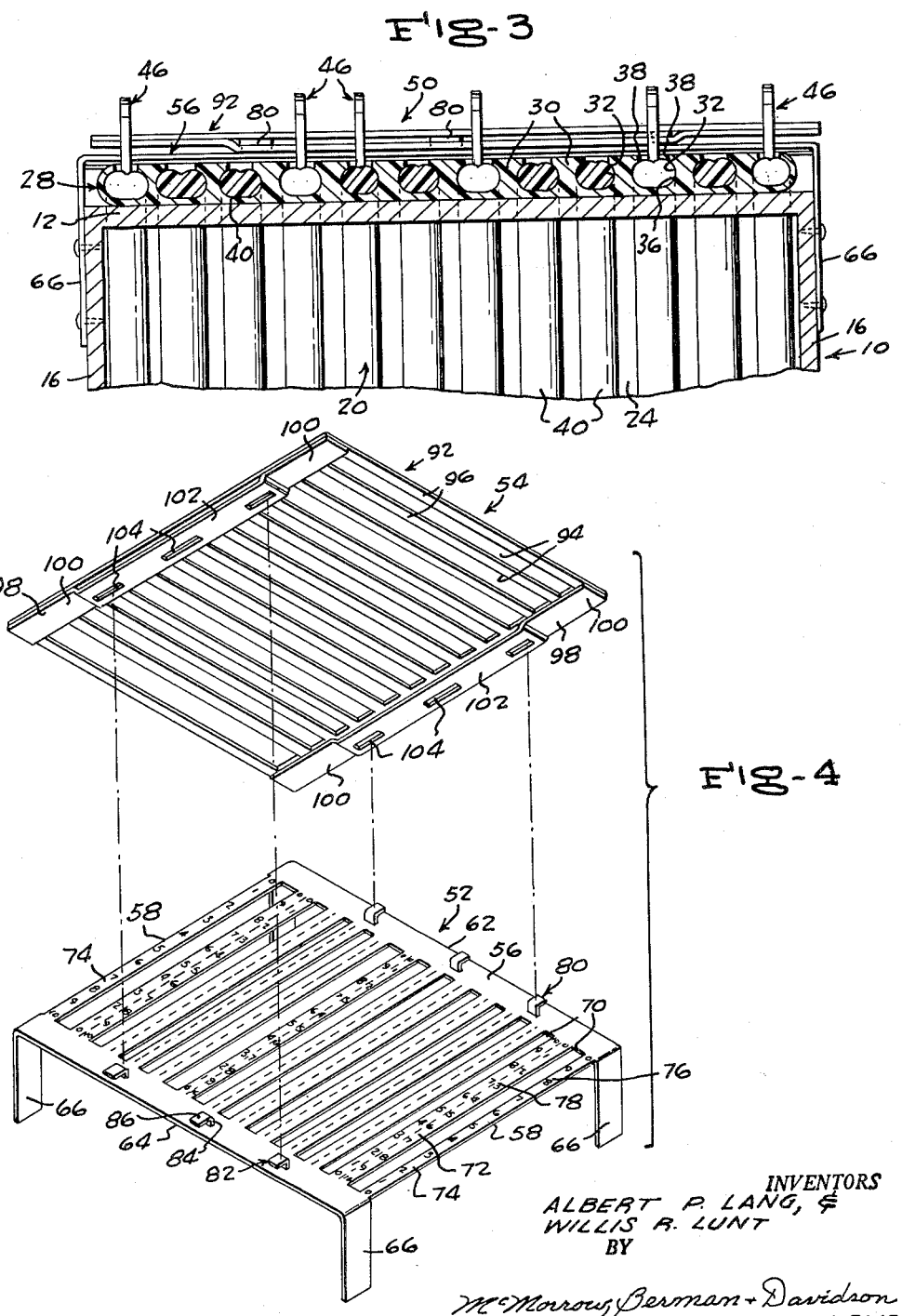

3,115,115
RACE HANDICAP INDICATOR
Albert P. Lang, 506 21st St., Manhattan Beach, Calif., and Willis R. Lunt, Long Beach, Calif.; said Lunt assignor to said Lang
Filed Oct. 7, 1960, Ser. No. 61,227
6 Claims. (Cl. 116—135)

This invention relates to a novel manual race handicap indicator, especially but not exclusively for rating race horses and dogs on prior performance and anticipated racing conditions.

The primary object of the invention is the provision of a simple, inexpensive, compact, and efficient indicator of the kind indicated, which can be made available in attractive, serviceable, and easily used forms at sufficiently low cost to warrant its general use by race fans and bettors.

Another object of the invention is the provision of an indicator of the character indicated above which has a plurality of individually adjustable race entry elements which are adapted to be operated, in one direction away from a common starting position, or "advanced" in accordance with one set of data, and when so "advanced" to be further "advanced" or "retracted," that is moved toward the starting point, in accordance with additional or different data, the amount of "advance" or "retard retraction" being made with reference to number scales.

A further object of the invention is the provision of an indicator of the character indicated above, wherein oppositely running "advance" and "retract" scales are provided along each race entry element, and a mask is provided which is movable to show one scale at a time, that is, either the "advance" scale or the "retract" scale, related to each entry element.

A still further object of the invention is the provision of an indicator of the character indicated above, wherein each race entry element is an elongated lengthwise movable slide bar which has projecting therefrom, in the case of a race horse rating indicator, representations of horses and jockeys, which can be executed in appropriate riding colors, so that the relative positions of the horses in a future or imagined race are graphically illustrated, and identification thereof readily made.

Other important objects and advantageous features of the invention will be apparent from the following description and the accompanying drawings, wherein, for purposes of illustration only, a specific form of the invention is set forth in detail.

In the drawings:

FIGURE 1 is a top plan view of an indicator of the present invention;

FIGURE 2 is a vertical longitudinal section taken on the line 2—2 of FIGURE 1 and showing manual application of a stylus or the like for moving a race entry form;

FIGURE 3 is an enlarged fragmentary vertical transverse section taken on the line 3—3 of FIGURE 2; and, FIGURE 4 is an exploded perspective view of the associated scales component and the movable scale-masking component.

Referring in detail to the drawings, wherein like numerals designate like parts throughout the several views, the illustrated indicator comprises a longitudinally elongated, flat hollow casing 10 having parallel top and bottom walls 12 and 14, respectively, and parallel side walls 16. The casing 10 is preferably open at its forward end, as indicated at 18, and is closed, at its rear end, by an arcuate concave guide 20 which, at its lower forward end, is secured to the casing bottom wall 14, at the rear end thereof, as indicated at 22. The arcuate guide 20 has a concave formed side 24.

The arcuate guide 20 merges, at its upper end into, or thereat is suitably secured to the rear end of a flat guide plate 28, which is suitably secured upon and extends the length of the casing top wall 12 to the open end 18. The flat horizontal guide plate 28 is provided, on its outer or upper side, with a plurality of longitudinal parallel spaced ribs 30, which define channels 32 therebetween. As shown in FIGURE 2, the bottom 34 of the top of the arcuate guide 20 is located at the tops of the channels 32.

As shown in FIGURE 3, the guide channels 32 are partially closed, at their tops, and are of horizontal oval cross section, produced by the facing concave sides 36 of the ribs 30, which, in effect, produce free laterally inwardly projecting spaced retaining flanges 38, at the top or open sides of the channels 32, which extend laterally inwardly from the channel sides 36.

Longitudinally elongated uniform cross section flexible slide bars 40, of oval cross section notching the channels 32, are slidably and retainably engaged in the channels 32, and are longer than the channels 32, so that, at any given time, rear end portions 42 of the slide bars 40 are flexed downwardly against the concave side 24 of the arcuate of the guide 20, as shown in FIGURE 2. With this arrangement, while slide bars are moved endwise toward the rear end of the casing 10, from forward positions, their rear end portions 42 will move downward and forwardly around the guide 20, and move forwardly from the guide 20, in accordance with the amounts of rearward adjustments of the slide bars 40.

Fixed to and extending outwardly or upwardly from the slide bars 40, at locations adjacent to their forward ends 44, are race entry representations, which can be in the form of a symbolic horse 46, mounted by a symbolic jockey 48. The horse 46 can be of the same or of different identifying colors, and the jockeys 48 are given colors indicating their or their stable's identity.

The indicator, while capable of being used and operated in a vertical position, is preferably used in a horizontal position, as shown, wherein the same is rested upon a suitable support, such as a table (not shown) or upon the user's knee, while at a race track.

Overlying and extending across the horizontal channels 32 and the slide bars therein, is a computing assembly, generally designated 50, which is composed of a fixed scale component 52, and a movable mask component 54. The scale component 52 comprises a flat rectangular plate 56, slightly longer than the width of the casing 10, and having side edges 58, and forward and rear edges 62 and 64, respectively. Fixed on and extending downwardly from the side edges 58, at the forward and rear ends thereof, are mounting bracket arms 66 which are suitably secured to the outer sides of the casing side walls 14, for supporting the plate 56 parallel above and close to the tops of the ribs 30 forming horizontal channels 32, with the rear edge 64 of the plate 56, at the rear end 68 of the casing top wall 12, as shown in FIGURE 2.

As shown in detail in FIGURE 4, the scale plate 56 is formed with a plurality of similar parallel spaced longitudinally slots 70 which define a plurality of relatively wide scale bars 72, and two narrower end scale bars 74, at the ends of the plate 56. On the upper surfaces of the inner scale bars 72 are similar longitudinal but reversed "advance" and "retract" scales 76 and 78, respectively, each consisting of the numerals 1 to 10, for example. The "advance" scales 76 start at similar locations near the rear edge of the plate 56 and run toward the forward edge 62 of the plate; while the "retract" scales 78 run in the opposite direction, that is, rearwardly. As shown, the "advance" scales 76 are preferably located to the left of the "retract" scales 78. This puts "retract" scales 78 adjacent to the end scale bars 74 which have "advance" scales 76 thereon. Thus, in effect, the slots 70 have "advance" and "retract" scales along their opposed edges.

Upstanding from the scale plate 56 between the ends of the slots 70 and the forward and rear edges of the plate, are transverse rows of forwardly facing and rearwardly facing hooks 80 and 82, respectively, having flat vertical shanks 84 and horizontal lateral retaining flanges 86. A transverse row of numerals 90, here shown as being 1 to 12 and running from left to right, is formed on the upper surface of the arcuate guide 20, immediately to the rear of the scale plate 56, for designating and identifying the slide bars 40 and their horses 46 and jockeys 48, the numerals 90 being aligned therewith.

The mask component 54, which is of substantially the same shape as the scale plate 56, comprises a flat plate 92 which is formed with parallel spaced longitudinal closed slots 94 which define masking bars 96 therebetween, the masking bars being about half the width of the scale bars 72, so that when the mask plate 92 is shifted sidewise relative to the scale plate 56 the masking bars 96 mask only either "advance" scales 76 or "retract" scales 78, at a time.

The mask plate 92 is movably mounted on the scale plate 56 by means of transversely elongated narrow forward and rear strips 98 which have limited length end portions 100 suitably fixed to the underside of the scale plate 56, at related ends thereof, and have downwardly offset intermediate portions 102, which are formed with rows of transversely elongated slots 104, through which the forward and rear hooks 80 and 82, respectively, are severally upwardly engaged, with their retaining flanges 86 engaged with the upper surfaces of the intermediate portions 102. The slots 104 are only sufficiently longer than the widths of the hook shanks 84 to enable the mask plate 92 to be shifted in either direction far enough to mask one set while masking the other set of scales on the scale plate 56.

The indicator can be made of suitable lightweight metal or of plastic or of combinations of such materials, in desired colors. The flexible slide bars can be made of rubber or rubber-like plastic materials, such as nylon or the like.

In operation, the slide bars 40, and hence the horses 46 are "advanced," that is moved forwardly relative to the computer assembly 50 or "retracted," that is, moved rearwardly toward the computer assembly 50, relative to each other, by manually applying a suitable implement, such as a stylus or large headed pin 106, through the slots of the mask plate 92 and the scale plate 56, against the tops of the slide bars 40, as shown in phantom lines in FIGURE 2, the implement being then used as the reference point, on a slide bar 40, relative to the "advance" scales 76 and the "retract" shifting of the slide bars 40, which correctly correspond with the weights given by the user of the computer to different favorable or positive factors and unfavorable or negative factors, relating to past performances of horses, track conditions, weight carried, and the like, in accordance with the knowledge available to and particular "system" used by the user of the computer.

When the various horses 46 have been given their final individual positions on the indicator, in the manner indicated above, it is clear at a glance what the relative betting values or merits of the horses are for the particular situation existing at the time. The numerals of the advance and retract scales are of contrasting colors, such as black and red, respectively. This enables the user to quickly and conveniently compare the posted or advance betting odds and handicaps against the positions of the horses on the indicator and to act accordingly.

Although there have been shown and described herein preferred forms of the invention, it is to be understood that the invention is not necessarily confined thereto, and that any change or changes in the structure of and in the relative arrangements of components thereof are contemplated as being within the scope of the invention as defined by the claims appended hereto.

What is claimed is:
1. A race handicap indicator comprising a plurality of laterally adjacent slide bars, means supporting the slide bars for endwise movements relative to each other, an indicating assembly supported on said means and extending over and across said slide bars, said assembly having laterally adjacent longitudinal slots therein registered with the slide bars, and manual means engageable with individual slide bars through slots for imparting endwise movement to slide bars, said slots having opposed edges, an advance scale on said assembly and extending along one edge of each slot and a retract scale on said assembly and extending along the other edge of each slot.

2. A race handicap indicator comprising a plurality of laterally adjacent slide bars, means supporting the slide bars for endwise movements relative to each other, an indicating assembly supported on said means and extending over and across said slide bars, said assembly having laterally adjacent longitudinal slots therein registered with the slide bars, and manual means engageable with individual slide bars through slots for imparting endwise movement to slide bars, said slots having opposed edges, advance scales on said assembly and extending along one slot edge and retract scales on said assembly and extending along the other slot edge, said indicating assembly comprising a relatively stationary scale plate having laterally spaced scale bars defining slots therebetween the advance and retard scales being on the scale bars, a mask plate circumposed on said scale plate having laterally spaced masking bars defining slots therebetween, said masking bars being narrower than the scale bars, and means mounting the masking plate on the scale plate for limited movement of the masking plate crosswise of the scale plate for alternately masking advance and retract scales while exposing other scales.

3. A race handicap indicator comprising a plurality of laterally adjacent slide bars, means supporting the slide bars for endwise movements relative to each other, an indicating assembly supported on said means and extending over and across said slide bars, said assembly having laterally adjacent longitudinal slots therein registered with the slide bars, and manual means engageable with individual slide bars through slots for imparting endwise movements to slide bars, said supporting means comprising an elongated flat casing having forward and rear ends and top and bottom walls and side walls, an arcuate guide closing the rear end of the casing, said guide having a forwardly facing concave side, a flat horizontal guide plate secured upon and extending along the casing top wall, said horizontal guide plate having laterally adjacent upwardly opening horizontal guide channels extending longitudinally thereof, said slide bars being flexible and being engaged in the horizontal channels and having rear end portions engaged with the concave side of the arcuate channels, and means retaining the slide bars in the horizontal channels.

4. A race handicap indicator comprising a plurality of laterally adjacent slide bars, means supporting the slide bars for endwise movements relative to each other, an indicating assembly supported on said means and extending over and across said slide bars, said assembly having laterally adjacent longitudinal slots therein registered with the slide bars, and manual means engageable with individual slide bars through slots for imparting endwise movement to slide bars, said slots having opposed edges, advance scales on the assembly and extending along one slot edge and retract scales on the assembly and extending along the other slot edge, said assembly comprising a relatively stationary scale plate having laterally spaced scale bars defining slots therebetween the advance and retract scales being on the scale bars, a mask plate superimposed on said scale plate having laterally spaced masking bars defining slots therebetween, said masking bars being narrower than the scale bars, and means mounting the masking plate on the scale plate for limited movement of the masking plate crosswise of the scale plate for alternately masking advance and retract scales while exposing other scales, said supporting means comprising an elongated flat casing having forward and rear ends and top and bottom walls and side walls, an arcuate guide closing the rear end of the casing, said guide having a forwardly facing concave side, a flat horizontal guide plate secured upon and extending along the casing top wall, said horizontal guide plate having laterally adjacent upwardly opening horizontal guide channels extending longitudinally thereof, said slide bars being flexible and being engaged in the horizontal channels and having rear end portions engaged with the concave side of the arcuate channels, and means retaining the slide bars in the horizontal channels.

5. A race handicap indicator comprising a plurality of laterally adjacent slide bars, means supporting the slide bars for endwise movements relative to each other, an indicating assembly supported on said means and extending over and across said slide bars, said assembly having laterally adjacent longitudinal slots therein registered with the slide bars, and manual means engageable with individual slide bars through slots for imparting endwise movement to slide bars, said slots having opposed edges, advance scales on the assembly and extending along one slot edge and retract scales on the assembly and extending along the other slot edge, said assembly comprising a relatively stationary scale plate having laterally spaced scale bars defining slots therebetween the advance and retract scales being on the scale bars, a mask plate superimposed on said scale plate having laterally spaced masking bars defining slots therebetween, said masking bars being narrower than the scale bars, and means mounting the masking plate on the scale plate for limited movement of the masking plate crosswise of the scale plate for alternately masking advance and retract scales while exposing other scales, and upstanding horse and jockey representations fixed on said slide bars and extending upwardly through the horizontal channels.

6. A race handicap indicator comprising a plurality of laterally adjacent slide bars, means supporting the slide bars for endwise movements relative to each other, an indicating assembly supported on said means and extending over and across said slide bars, said assembly having laterally adjacent longitudinal slots therein registered with the slide bars, and manual means engageable with individual slide bars through slots for imparting endwise movement to slide bars, said slots having opposed edges, advance scales on the assembly and extending along one slot edge and retract scales on the assembly and extending along the other slot edge, said assembly comprising a relatively stationary scale plate having laterally spaced scale bars defining slots therebetween the advance and retract scales being on the scale bars, a mask plate superimposed on said scale plate having laterally spaced masking bars defining slots therebetween, said making bars being narrower than the scale bars, and means mounting the masking plate on the scale plate for limited movement of the masking plate crosswise of the scale plate for alternately masking advance and retract scales while exposing other scales, and upstanding horse and jockey representations fixed on said slide bars and extending upwardly through the horizontal channels, at their forward ends.

References Cited in the file of this patent
UNITED STATES PATENTS

| | | |
|---|---|---|
| 1,649,379 | Bergmann | Nov. 15, 1927 |
| 1,711,981 | Andres et al. | May 7, 1929 |
| 1,862,901 | Martin | June 14, 1932 |
| 1,892,634 | Rubinsky | Dec. 27, 1932 |
| 2,109,736 | Roth | Mar. 1, 1938 |
| 2,488,338 | Senegas | Nov. 15, 1949 |
| 2,508,239 | Feldblet | May 16, 1950 |